US007050593B1

(12) United States Patent
Emerling et al.

(10) Patent No.: US 7,050,593 B1
(45) Date of Patent: May 23, 2006

(54) VEHICULAR AUDIO SYSTEM AND ELECTROMAGNETIC TRANSDUCER ASSEMBLY FOR USE THEREIN

(75) Inventors: David M. Emerling, West Bloomfield, MI (US); Pawel W. Sleboda, Bloomfield Hills, MI (US); John F. Mola, Ferndale, MI (US); Robert J. True, Kenosha, WI (US); David J. Prince, Villa Park, IL (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/382,851

(22) Filed: Aug. 25, 1999

(51) Int. Cl.
*H04B 1/00* (2006.01)

(52) U.S. Cl. ......................... 381/86; 381/361; 181/161

(58) Field of Classification Search ................ 381/361, 381/365, 386, 296, 280, 99, 190, 186, 84–89, 381/59, 302, 389, 152, 341, 184, 96; 181/161, 181/144, 296, 280
See application file for complete search history.

(56) References Cited

U.S. PATENT DOCUMENTS

| | | | | |
|---|---|---|---|---|
| 4,385,210 | A * | 5/1983 | Marquiss | 179/114 |
| 4,641,345 | A * | 2/1987 | Takahashi | 381/86 |
| 4,792,978 | A | 12/1988 | Marquiss | |
| 4,856,071 | A | 8/1989 | Marquiss | |
| 5,450,057 | A * | 9/1995 | Watanabe | 340/435 |
| 5,606,623 | A * | 2/1997 | Bahm, III et al. | 381/86 |
| 5,617,480 | A | 4/1997 | Ballard et al. | |
| 5,710,818 | A * | 1/1998 | Yamato et al. | 381/1 |
| 5,754,664 | A * | 5/1998 | Clark et al. | 381/86 |
| 5,887,071 | A * | 3/1999 | House | 381/386 |
| 5,901,231 | A | 5/1999 | Parrella et al. | |
| 6,058,196 | A | 5/2000 | Heron | |
| 6,181,797 | B1 | 1/2001 | Parrella et al. | |
| 6,332,029 | B1 | 12/2001 | Azima et al. | |
| 6,337,355 | B1 * | 1/2002 | Yamashita et al. | 521/115 |
| 6,356,641 | B1 * | 3/2002 | Warnaka et al. | 381/190 |
| 6,377,695 | B1 * | 4/2002 | Azima et al. | 381/152 |

FOREIGN PATENT DOCUMENTS

| | | | | |
|---|---|---|---|---|
| EP | 0411 786 A1 | | 2/1991 | |
| WO | WO 98/13942 | | 4/1998 | |
| WO | WO 98/16409 | | 4/1998 | |
| WO | WO 98/42536 | | 10/1998 | |
| WO | WO 99/11490 | * | 3/1999 | 381/152 |

OTHER PUBLICATIONS

Soren Bech, Electroacoustic Simulation of Listening Room Acoustics. Psychoacoustic Design Criteria, Audio Engineering Society, 89th Convention Sep. 21-25, 1990, Los Angeles, USA, 34pp.

(Continued)

*Primary Examiner*—Huyen Le
*Assistant Examiner*—Lun-See Lao
(74) *Attorney, Agent, or Firm*—Brooks Kushman P.C.

(57) ABSTRACT

A vehicle overhead audio system and an electromagnetic transducer assembly for use therein are provided where a headliner of the vehicle is a loudspeaker of the system thereby replacing many other loudspeakers and being invisible to the occupants. The headliner is driven in multiple zones that effect proper imaging for all occupants. Supplemental high frequency and subwoofer speakers and signal processing circuitry are included in one aspect of the invention.

4 Claims, 3 Drawing Sheets

OTHER PUBLICATIONS

Junger, M, et al., Sound, Structures And Their Interaction, 1972, Cambridge, MA, MIT Press, pp. 235-236.

Pierce, A., Acoustics, Acoustical Society of America, Woodbury, NY, 1989, p. 128.

* cited by examiner

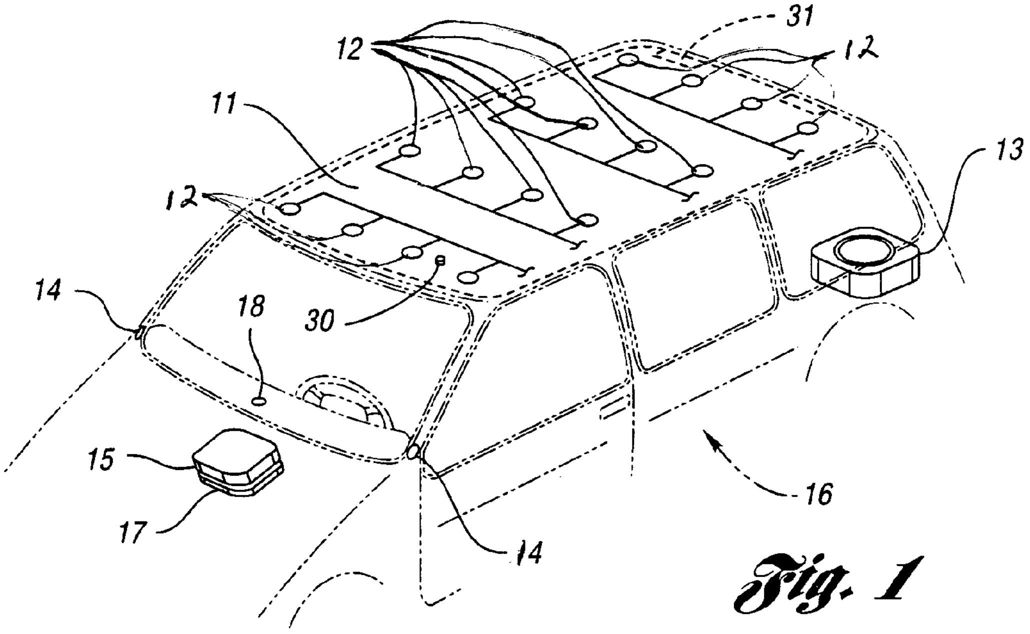
Fig. 1
Fig. 3
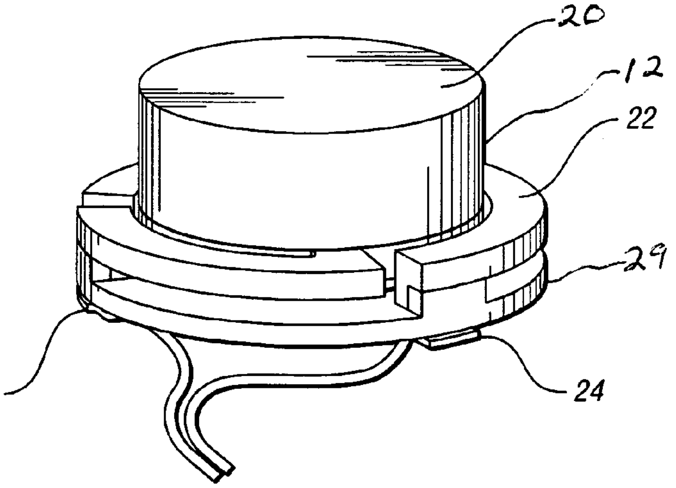
Fig. 4
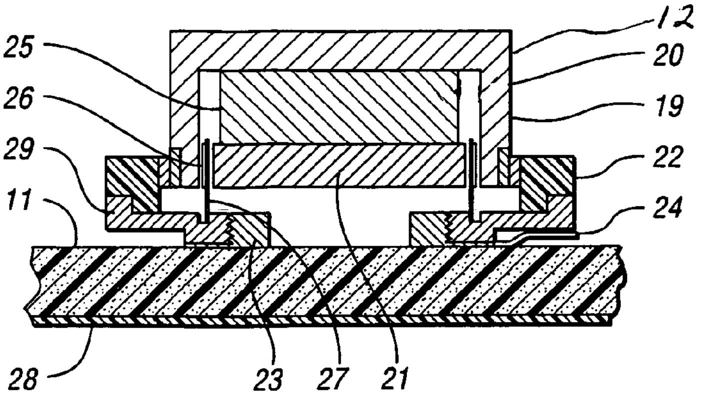

VEHICULAR AUDIO SYSTEM AND ELECTROMAGNETIC TRANSDUCER ASSEMBLY FOR USE THEREIN

TECHNICAL FIELD

This invention relates to vehicular audio systems and electromagnetic transducer assemblies for use therein.

BACKGROUND ART

Traditionally, individual moving coil and cone loudspeakers are placed within the doors, instrument panel and rear tray and elsewhere in a vehicle for providing sound within the vehicle. These speakers add substantial weight to a vehicle, require individual installation and connection, occupy valuable interior trim space, allow significant road noise intrusion, and are subject to substantial shock and environmental abuse.

Most significantly, they are poorly positioned for listening. Their on-axis radiation is typically directed low in the vehicle toward occupants legs and midsections rather than at the occupants ears. The direct sound from the speaker to the listener is typically far off-axis and highly variable in frequency response with typically insufficient high frequencies. In the high noise environment of a vehicle, this typically results in mid and high frequency audio information getting lost. "Imaging", the perception of where sound is coming from, is also adversely affected since the loudspeakers are low in the vehicle; for the front passengers, the audio image is pulled down into the doors while the rear passengers have an image to the side or rear instead of what should be presented in front of them.

As a solution to this problem, some proposed systems, including the system described in the U.S. patent to Clark et al. U.S. Pat. No. 5,754,664, have incorporated small, lightweight loudspeaker drivers above the occupants in the headliner in addition to the door and rear package tray speakers. Unfortunately, the small loudspeaker can still be localized due to the fact that the listener is far enough to be in the free field of acoustic radiation but not far enough to be experiencing a plane wave condition.

This phenomenon, as documented by Soren Bech and others results in an unnatural simulation of an acoustic space. S. Bech, "Electroacoustic Simulation of Listening Room Acoustics. Psychoacoustic Design Criteria", Audio Engineering Society, 89th Convention 21–25 Sep. 1990, Los Angeles, USA, 34 pp. The most significant drawback of this approach, however, is that the overall system complexity and cost is increased due to the addition of individual drivers overhead while the conventional speakers still remain in the doors and rear package tray. Furthermore, the noise paths through the door and rear package trays still exist and more noise paths from the roof (as occurs in rain) are opened with the new lightweight cone speakers in the headliner. Lastly, making the drivers invisible would be extremely difficult, since the small speakers are mounted onto the headliner; even if acoustically transparent fabric were placed over the drivers, the holes in the headliner would result in "read-thru" or visibility.

The Verity Group PLC has applied for a number of patents covering various aspects of flat panel loudspeaker (i.e., NXT) technology. The technology operates on the principle of optimally distributive modes of vibration. A panel constructed in accordance with this technology has a very stiff structure and, when energized, develops complex vibrations mode over its entire surface. The panel is said to be dispersive in that the shape of the sound wave traveling in the panel is not preserved during propagation.

Unfortunately, distributed mode panel loudspeakers require precise geometries for exciter placement and panel suspension thus limiting their size and integration capabilities into a headliner. Essentially, they would be separate speakers assembled into a hole in the headliner or onto the surface of the headliner. In the first case, they would also result in extra noise transmission (since the panels are extremely light) or in the second case, they would be visible to the occupants either as bumps or edges in typical headliner covering materials. In both cases, added complexity is the result.

From a sonic performance viewpoint, distributed mode panels suffer from poor low frequency response (typically restricted to 250 Hz and above for sizes integral to a headliner) and low output. Neither of these conditions make NXT panels suitable for headliner applications, particularly in a high noise environment. Furthermore, distributed mode panels are incapable of precise imaging, presenting instead a diffuse acoustic field perception where the sound appears to come from everywhere. While distributed mode panels might improve overall spaciousness, they would still require full range loudspeakers in the doors or rear package tray for sufficient acoustic output and other speakers in front for proper imaging.

In the U.S. patent to Parrella et al. U.S. Pat. No. 5,901,231, driving portions of interior trim with piezoelectric elements to reproduce audio frequencies is disclosed. However, the use of piezo-electric elements restricts them to dividing up the trim into different sections for different frequency ranges adding complexity to the system. Furthermore, the excursion limits of piezo elements limits the output level and low frequency range of the trim panels such that conventional cone speakers would be required to produce lower frequencies. The piezo elements also require complicated integration into the trim element and are difficult to service. Lastly, the piezo elements require additional circuitry to convert typical output from an automotive head unit further complicating the system.

The above-noted application entitled "Integrated Panel Loudspeaker System Adapted To Be Mounted In A Vehicle" describes flat panel systems with an electromagnetic drive mechanism integrated into an aperture in the panel. However, the driving mechanism that is integrated into the panel is constructed without steel pieces to contain, direct and concentrate the magnetic flux to its best advantage. The voice coil required is also relatively massive severely limiting the high frequency output. Thus, the output level is not adequate for typical audio performance. Furthermore, the aperture that the electromagnetic drive mechanism is insufficiently stiff to produce high frequency output.

The U.S. patents to Marquiss U.S. Pat. Nos. 4,385,210, 4,792,978 and 4,856,071 disclose a variety of planar loudspeaker systems including substantially rigid planar diaphragms driven by cooperating coil and magnet units.

Thus, even with the above prior advancements in flat speaker technology and overhead audio, prior audio systems have not been simplified. There is still a need to reduce parts and labor cost, decrease weight, decrease exterior noise penetration, provide believable imaging, reduce speaker visibility, increase reliability, and provide easy serviceability.

It is therefore desirable to provide an audio system which achieves the above by using existing trim panel space and mounting techniques, conventional audio signal head unit output, advanced material properties manipulation and well established signal processing, and psychoacoustic techniques.

DISCLOSURE OF INVENTION

This application is related to U.S. patent applications entitled "Method of Making a Vehicle Headliner Assembly with Integral Speakers" filed Jul. 24, 1998 and having U.S. Ser. No. 09/121,788, now issued as U.S. Pat. No. 6,555,042, and "Integrated Panel Loudspeaker System Adapted To Be Mounted In A Vehicle", filed Nov. 3, 1998 and having U.S. Ser. No. 09/185,168, now abandoned.

An object of the present invention is to provide a vehicular audio system and electromagnetic transducer assembly for use therein wherein conventional full range cone loudspeakers located in doors, package trays, trunks, seats, and dashboards are replaced with a single multichannel headliner speaker thereby reducing weight, cost, and complexity of audio systems while freeing up valuable space formerly allocated for conventional speakers.

In carrying out the above object and other objects of the present invention, an audio system is provided for use in a vehicle having a roof. The system includes an acoustically-insulating headliner adapted to be mounted adjacent the roof so as to underlie the roof and shield the roof from view. The headliner has an upper surface and a sound-radiating, lower surface. The system also includes a source of audio signals and an array of electromagnetic transducer assemblies supported at the upper surface of the headliner. The system further includes signal processing circuitry coupled to the assemblies for processing the audio signals to obtain processed audio signals wherein the assemblies convert the processed audio signals into mechanical motion of corresponding zones of the headliner. The headliner is made of a material which is sufficiently stiff and low in density so that the headliner radiates acoustic power into the interior of the vehicle with a frequency range defined by a lower limit of 100 hertz or less and an upper limit of 12 kilohertz or more. The processed audio signals at a low end of the frequency range are matched to the processed audio signals at mid and high ends of the frequency range.

Preferably, the vehicle has a windshield and an array of electromagnetic transducer assemblies including at least one row of electromagnetic transducer assemblies adjacent the windshield. The at least one row of electromagnetic transducer assemblies are positioned 5 to 30 inches in front of an expected position of a passenger in the interior of the vehicle.

Also, preferably, the at least one row of electromagnetic transducer assemblies are positioned 12 to 24 inches in front of the expected position of the passenger. The at least one row of electromagnetic transducer assemblies includes at least two electromagnetic transducer assemblies spaced apart to correspond to left and right ears of the passenger in the expected position of the passenger.

Still, preferably, each of the electromagnetic transducer assemblies includes a magnet for establishing a magnetic field in a gap formed within the assembly, a coil which moves relative to the magnet in response to the processed audio signals, a base fixedly secured to the headliner on the upper surface and electrically connected to the signal processing circuitry and a guide member electrically connected to the coil and removably secured to the base for supporting the coil in the gap. The coils are electrically coupled to the signal processing circuit when the guide members are secured to their corresponding bases.

Preferably, each of the magnets is a high-energy permanent magnet such as a rare-earth magnet.

Each of the assemblies further includes a spring element having a resonant frequency below the lower limit of the frequency range when incorporated within the assembly. Each spring element is connected to its corresponding guide member for resiliently supporting its corresponding magnet above the upper surface of the headliner.

The array of electromagnetic transducer assemblies includes a front row of electromagnetic transducer assemblies positioned 5 to 30 inches in front of an expected position of a passenger in the interior of the vehicle and a back row of electromagnetic transducer assemblies positioned behind the expected position of the passenger. The signal processing circuitry delays the audio signals coupled to the back row of electromagnetic transducer assemblies relative to the audio signals coupled to the front row of electromagnetic transducer assemblies.

The array of electromagnetic transducer assemblies are preferably completely supported on the upper surface of the headliner.

Preferably, at least one loudspeaker is coupled to the signal processing circuitry and is adapted to be placed in the interior of the vehicle in front of an expected position of a passenger and below the headliner.

The headliner material has a stiffness between 1E9PA and 5E9PA and a density of between 100 and 800 kilograms per meter cubed.

Further in carrying out the above objects and other objects of the present invention, an electromagnet transducer assembly is provided. The assembly includes a subassembly having a housing and a magnet for establishing a magnetic field within the housing and a coil which moves relative to the magnet in response to an audio signal. The subassembly also includes a flexible spider and guide member for supporting the coil centrally within the magnetic field. The assembly further includes a mating base piece for attaching the subassembly to a vehicle headliner wherein the subassembly is removably secured to the mating base piece by screwing, snapping or twisting.

The invention overcomes the problems of the prior art by: making the entire headliner the loudspeaker diaphragm; carefully choosing the diaphragm materials; and shaping and matching motors to provide proper imaging, high acoustic output, and wide frequency response with low distortion. The headliner diaphragm speaker becomes "invisible" and substantially all the conventional cone speakers that would be placed in doors, and front or rear package trays may be eliminated. The headliner diaphragm speaker is excited by subassembled drive motor assemblies that are entirely supported by the headliner.

According to one aspect of the invention, different sound zones may be created by in the headliner diaphragm speaker by placement of subassembled drive motors.

According to another aspect of the invention, the headliner diaphragm speaker and the subassembled drive motors are entirely supported by the headliner diaphragm speaker.

According to a further aspect of the invention, by properly placing the subassembled drive motors in relation to the listeners head, the sound image is naturally placed in front of the listener.

According to yet a further aspect of the invention, by properly shaping the headliner diaphragm, broadband frequency response, sufficient acoustic output, and accurate imaging are created from the headliner diaphragm speaker for each listener.

According to another aspect of the invention, by matching the mass of the subassembled drive motors to the headliner diaphragm speaker, broadband frequency response, high acoustic output, and detailed imaging are created from the headliner diaphragm speaker for each listener.

According to another aspect of the invention, by properly choosing materials for the headliner diaphragm speaker, broadband frequency response, sufficient acoustic output, and detailed imaging are created from the headliner diaphragm speaker for each listener.

According to another aspect of the invention, the diaphragm material is selected so that the speed and decay of sound in the headliner diaphragm is such that the sound zones do not overly conflict with other nearby zones.

According to another aspect of the invention, the diaphragm material is selected so that the speed and decay of sound in the headliner diaphragm speaker produce mechanical summing and mixing of discrete and/or phantom channels.

According to another aspect of the invention, by placing supplemental speakers in the A-pillars, sail panels, or instrument panel, imaging and high frequency response can be improved.

According to another aspect of the invention, by providing conventional signal processing techniques including delay and equalization of signals in time in the front, mid, and rear of the headliner diaphragm speaker, the imaging for all listeners can be improved.

According to another aspect of the invention, by providing head-related transfer function signal processing techniques, the imaging for all listeners can be improved.

According to another aspect of the invention, by providing switchable circuitry providing various signals to the subassembled drive motors, the response of the headliner diaphragm speaker can be changed for one or more occupants and for monaural, stereo, or multi-channel playback.

According to another aspect of the invention, cabin communication systems, voice activated controls, mobile communications and other multimedia events may be integrated and customized with the overhead audio system.

According to another aspect of the invention, signal processing, equalization, delays and amplification may be included within a unit integral to the headliner.

According to another aspect of the invention, a subassembled drive motor is defined as a subassembled electromechanical device for converting an electrical signal to a mechanical motion.

According to another aspect of the invention, the subassembled drive motors are easily installed and serviced with subassemblies that twist in or screw on to the headliner diaphragm. They can be installed as OEM equipment or can replace existing headliners as after-market product. The subassemblies are stand-alone operational units that can be tested for quality and performance before attachment to the headliner.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a perspective view of a vehicle, indicated by phantom lines, incorporating the audio system of the present invention;

FIG. 3 is a perspective view of an electromagnet transducer assembly of the present invention;

FIG. 4 is a sectional view, partially broken away, of one such assembly supported on a top surface of a headliner with its covering material;

BEST MODE FOR CARRYING OUT THE INVENTION

Figure 2:
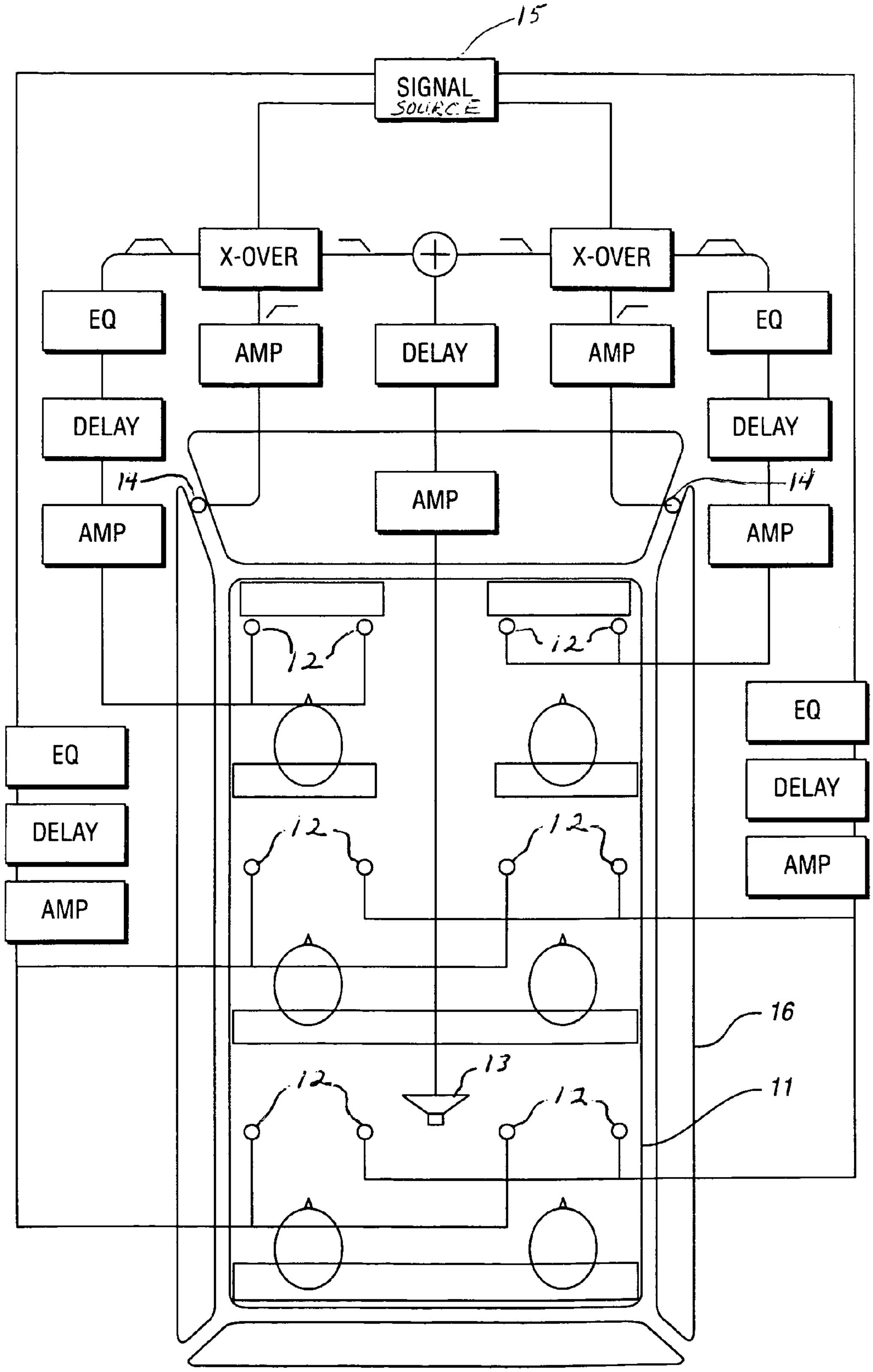
FIG. 2 is a top plan view of the vehicle of FIG. 1 with a signal source of audio signals, electromagnetic transducer assemblies positioned relative to expected positions of passengers, and signal processing circuitry indicated in block diagram form.
Figure 5:
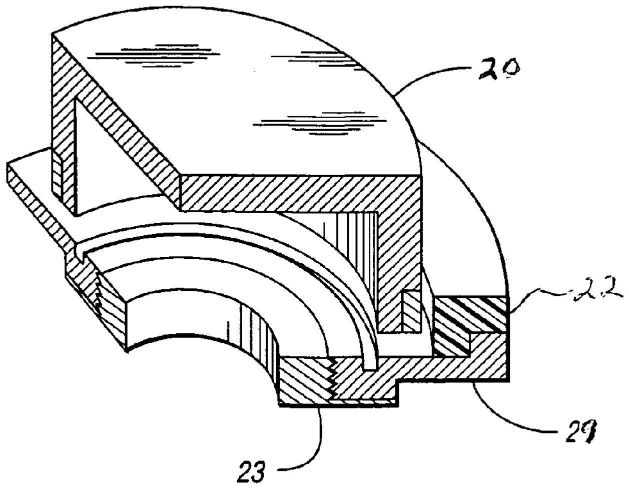
FIG. 5 is a perspective sectional view of a base, a guide member threadedly connected to the base, a spring element such as a "spider" connected to the guide member and a steel housing cup without a magnet or a top piece of the assembly.

Referring now to FIG. 1, there is illustrated a vehicle, generally indicated by reference numeral 16, including an audio system embodying the invention. The audio system includes either a commercially available audio or signal source 15 which may include a tuner, cassette player, compact disc player, DVD player, communications unit, etc. or a unit incorporating the above with additional signal processing circuitry to provide signal delays, equalization and amplification as described below. The additional signal processing including signal delays and amplification as described below may be incorporated into a separate unit 17.

Processed audio signals of the unified audio unit or the separate signal processing/amplifier unit 17 are conducted via audio cabling to electromagnetic transducer assemblies in the form of subassembled drive motors 12 that are affixed to a headliner 11 which operates as a headliner speaker diaphragm per the functional diagram shown in FIG. 2.

Audio signals that are high passed and undelayed, but possibly equalized, are also sent to the forward mounted tweeters or speakers 14. The forward mounted speakers 14 may be conventional speakers and may be anywhere in front of the driver for optimal frontal imaging by those skilled in the art. The forward mounted speakers 14 should have a frequency response extending up to a minimum of 17 KHz and as low in frequency as possible without adversely affecting the off-axis high frequency response. For audio systems supporting 5.1 and multichannel playback, additional forward mounted speakers 18 may be added in between the others.

Audio signals that are low passed, delayed and equalized are sent to a subwoofer 13 as illustrated in FIG. 2. The subwoofer 13 may be located anywhere in the vehicle 16 and delayed, crossed over and equalized to avoid localization and provide an even response.

The subassembled drive motors 12 are placed in front of each listener some 12–16" in front of the ears and to each side for optimal left-right signal separation as best shown in FIG. 2. The first row of subassembled drive motors is placed near the windshield of the vehicle 16, the second row is placed in front of the next seat to the rear such that they are forward enough from the second row occupants but not sufficiently close to the front row occupants to cause imaging confusion. Exact optimal dimensions depends on the degree of signal processing, output level and delay applied to each channel. The same technique is used for any subsequent rows of seating until one row of subassembled drive motors is placed behind the last row of listeners as shown in FIG. 1 but not FIG. 2.

Referring now to FIGS. 3–9, the subassembled drive motors 12 are designed and manufactured as individual electromechanical motors whose function is to convert electrical signals into mechanical motion. A permanent magnet field is achieved in a narrow voice coil gap 26 by use of a neodymium rare earth magnet 25 and a high permeability steel cup 20 and plate 21 pieces.

Figure 6:
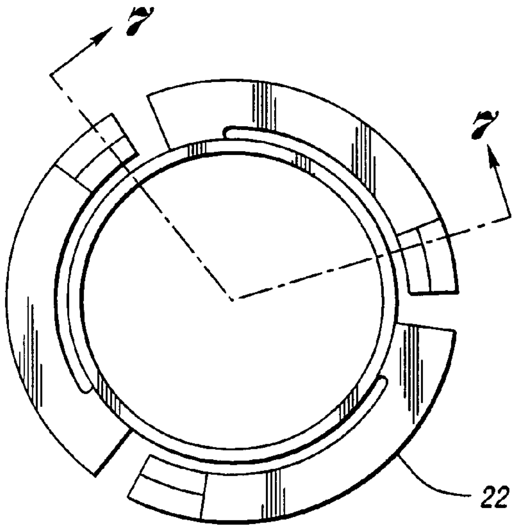
FIG. 6 is a top plan view of the spring element.
Figure 7:
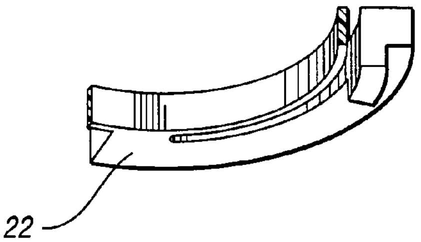
FIG. 7 is a one-third perspective view of the spring element from below taken along lines 7—7 of FIG. 6.
Figure 8:
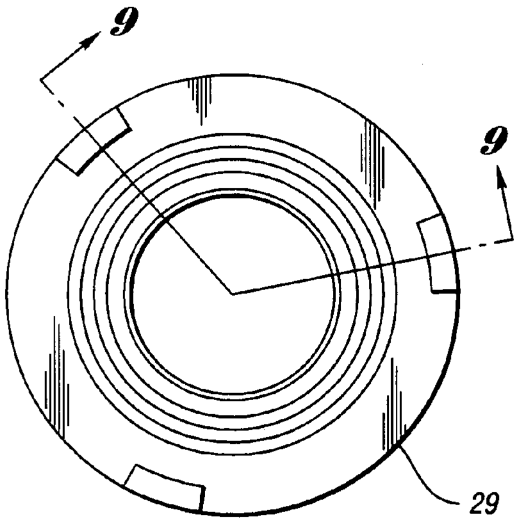
FIG. 8 is a top plan view of the guide member.
Figure 9:
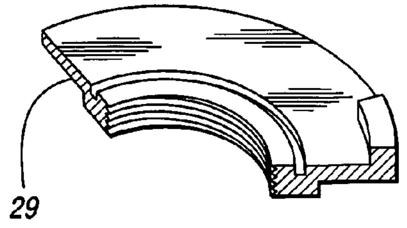
FIG. 9 is a one-third perspective view of the guide member from above taken along lines 9—9 of FIG. 8.

The magnet 25, cup 20, and plate 21 are suspended by a one-piece, spider 22 tuned to a specific resonant frequency as illustrated in FIGS. 6 and 7. A guide member 29 illustrated in FIGS. 8 and 9 connected to the spider 22 serves to hold and center a voice coil 27 in the magnetic field gap 26 while removably attaching the rest of the subassembly to a motor base 23. The spider 22 and the guide member could be made into one integral part.

The guide member 29 also contains two insert molded electrical contacts to which the voice coil 27 is soldered on one end and the other end mates with base contacts 24. The motor base 23 is directly adhered to the headliner 11 and contains insert molded electrical contacts that mate with the contacts of the guide member 29 on one end and are soldered to a signal wire (shown in FIG. 3) on the other end. Electrical contact between the base 23 and the guide member 29 may be made, for example, by metallizing the threads of the base 23 and the guide member 29.

The subassembled driver motors 12 are self-contained and designed to be assembled to the headliner 11 via the bases 23. Each assembly 12 both creates an acoustically efficient connection between the driving force of the motor and the headliner speaker diaphragm 11 and provides a means of making electrical contact between the voice coil 27 and the signal wires. Thus, each assembly 12 is simplified as mechanical and electrical connection is made in one screw, snap-in or twist-lock action. Furthermore, it provides an easy method of servicing the assembly 12 should one of them fail.

The subassembled drive motors or assemblies 12 are sized in dimension, weight, and contact area to match the stiffness, shape, density and suspension points of the headliner 11 or headliner speaker diaphragm. The excursion limits, power handling and efficiency of the subassembled drive motors 12 are also designed to match the physical characteristics of the headliner speaker diaphragm 11 and the air cavity between the headliner 11 and the diaphragm. In one application, the mass of the motor 12 is 94 grams, the resonant frequency is 50 Hz, the contact area is based on a 1" diameter voice coil 27, and the maximum excursion of the motor assembly 12 is 2.5 mm in either direction. The processed audio signals provided to the subassembled drive motors 12 thus causes mechanical motion which then moves the headliner speaker diaphragm 11 in accordance with the processed audio signal.

Boundary conditions of the headliner or panel 11 are not as critical as a distributed mode panel since the acoustic radiation is not dependent on the existence of modes within the panel 11. However, the boundaries do need to be controlled to avoid excessive rattling. To achieve this, the majority of the perimeter is clamped with a semi-compliant membrane. Additional compliant clamping occurs at the boundaries of dome lamps, consoles and other penetrations. Furthermore, all signal and power wires above the headliner 11 are either clamped or integrated into the headliner diaphragm material.

In the preferred embodiment of the invention, the audio signal is first delivered to the high frequency speakers 14 as described above. Those skilled in the art of audio system tuning may then set the time delay and relative level of the audio signals delivered to the assemblies 12 on the headliner 11 so that the sound arriving at the occupant's ears enables the psycho-acoustic effect of precedence; this makes the image appear to come from in front of the occupants and not from the headliner 11 above. Since the precedence effect is both level and time dependent and since the interior acoustics dominate these settings, each vehicle 16 is tuned uniquely. In one instance of the invention, the audio signal fed to the front row of subassembled motors or assemblies 12 was delayed 7.5 milliseconds after the audio signal fed to the high frequency forward speakers 14. The subsequent rows of subassembled motors 12 were supplied with an audio signal delayed 25 milliseconds after the high frequency forward speakers 14. Additionally, the subwoofer audio signal, a sum of left/right and forward/rear signals per standard practice, was delayed to match the subassembled motors 12 closest to it.

The system design is complicated by the fact that all the subassembled motors 12 are mechanically moving a single headliner or speaker diaphragm 11. Since each subassembled motor 12 is individually reconfigurable, the headliner speaker diaphragm properties must be such that while providing adequate stiffness and light weight for adequate sound pressure and high frequency output, the vibration in the panel 11 must decay quickly enough or the speed of sound in the panel 11 must be slow enough that the signals from adjacent or distant subassembled motor 12 do not cause imaging problems. Those skilled in the art of tuning sound systems will realize that the acoustic vibration caused from the vibration of a forward motor 12 may reach the rear of the vehicle 16 thus causing imaging problems. Similarly, signals from the left channels may interfere with the right channels. These problems must be avoided by choosing proper materials and diaphragm construction dependent on individual vehicle constraints.

The headliner material has a stiffness (modulus of elasticity, Youngs modulus) between 1E9 Pa and 5e9 Pa and a density between 100 and 800 Kg/m 3. For one implementation of the preferred embodiment, the headliner 11 or speaker diaphragm was constructed of TRU (thermal foamable rigid urethane) with material properties of 7 mm thickness, Young's modulus of elasticity=2e9, density of 231 kg/m$^3$, damping of 4.5%. The headliner 11 was covered with a foam coverstock 28 for cosmetic and damping purposes. Although well established sound reinforcement guidelines of signal delay vs. signal level difference exist for success of precedence with discrete drivers, these must be modified to account for any significant headliner diaphragm vibrations traveling faster than the speed of sound in air. This is typically accomplished through trial and error techniques with listening evaluations.

As mentioned above, the system can be modified for various applications. In general stereo playback mode, the drivers are typically split up so that left right channel separation is preserved throughout the length of the vehicle 16. Thus, through the use of delays as mentioned before, the audio image is preserved as in front of the vehicle 16 for all occupants. In the case of video playback, where the driver is not engaged in the video viewing, the front motor subassemblies 12 are turned off or muted and the first row of motor subassemblies 12 in front of the rear seats becomes the undelayed audio signal and the delay settings are reset based on that row being precedent. The audio image is naturally drawn up toward the headliner 11 and the raised screen. The rear subassembled motors 12 then are fed the surround mode for the entire vehicle 16. Center channel reproduction can be created either by dedicating the center subassembled motors 12 to the center channel or by splitting the center channel and summing with the left and right motors 12. The center channel is then created through mechanical mixing of the movement of the headliner 11.

Multiple phantom images can also be created between center and side subassembled motors 12 as the headliner 11 creates a real radiator between those two channels.

For program material desiring a non-localized audio image, the user or program mode of the head unit can easily adjust the delay settings to create a more spacious atmosphere in the interior or cabin of the vehicle 16.

Applications also extend to communications systems. One intra-cabin communication system places a microphone 30 on the surface of the headliner 11 in front of one or multiple passengers. Typical voice activated systems then distribute conversation throughout the cabin with cancellation of any non-conversational audio program signal. Gain before feedback is increased by nature of the localization of subassembled motors 12 and the near-field location of the microphone 30 within the panel 11. Additional cancellation DSP techniques can be employed to further increase gain before feedback.

Extra-cabin communication systems are easily integrated whether based upon cellular, digital or other systems. In this case, the overhead audio system allows the driver or other communicant to have the communication signals sent only to his local listening area while the other occupants continue to listen to standard program material.

Warning systems may also be integrated into the overhead system such that a local warning such as a door being ajar is delivered only to the driver and the passenger closest the area of concern without disturbing other occupants.

As signal processing capabilities increase, the incorporation of more and more localized equalization and effects becomes more economical to the point of effecting individualized user control for each zone within the limits of the acoustic space.

Uniquely approachable by the invention is the feasibility of incorporating noise cancellation techniques. The proximity of the listeners ears to the headliner speaker increase the rate of success as the sound field prediction and adjustment is less and less affected by the complexities of the acoustic environment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An audio system for use in a vehicle having a roof, the system comprising:

an acoustically-insulating headliner adapted to be mounted adjacent the roof so as to underlie the roof and shield the roof from view, the headliner having an upper surface and a sound-radiating, lower surface;

a source of audio signals;

an array of electromagnetic transducer assemblies supported at the upper surface of the headliner;

signal processing circuitry coupled to the assemblies for processing the audio signals to obtain processed audio signals wherein the assemblies convert the processed audio signals into mechanical motion of corresponding zones of the headliner and wherein the headliner is made of a material which is sufficiently stiff and low in density so that substantially the entire headliner acts as a single headliner speaker diaphragm and radiates acoustic power into the interior of the vehicle with a frequency range defined by a lower limit of 100 hertz or less and an upper limit of 12 kilohertz or more and the processed audio signals at a low end of the frequency range are matched to the processed audio signals at mid and high ends of the frequency range and wherein the headliner material has a stiffness between 1E9PA and 5E9PA and a density of between 100 and 800 kilograms per meter cubed.

2. An audio system for use in a vehicle having a roof, the system comprising:

an acoustically-insulating headliner adapted to be mounted adjacent the roof so as to underlie the roof and shield the roof from view, the headliner having an upper surface and a sound-radiating, lower surface;

a source of audio signals;

an array of electromagnetic transducer assemblies supported at the upper surface of the headliner;

signal processing circuitry coupled to the assemblies for processing the audio signals to obtain processed audio signals wherein the assemblies convert the processed audio signals into mechanical motion of corresponding zones of the headliner and wherein the headliner is made of a material which is sufficiently stiff and low in density so that substantially the entire headliner acts as a single headliner speaker diaphragm and radiates acoustic power into the interior of the vehicle with a frequency range defined by a lower limit of 100 hertz or less and an upper limit of 12 kilohertz or more and the processed audio signals at a low end of the frequency range are matched to the processed audio signals at mid and high ends of the frequency range and wherein the headliner material has a stiffness (modulus of elasticity, Youngs modulus) between 1E9 Pa and 5e9 Pa and a density between 100 and 800 Kg/m^3 and wherein the headliner material may be made from single materials or composites.

3. An audio system for use in a vehicle having a roof, the system comprising:

an acoustically-insulating headliner adapted to be mounted adjacent the roof so as to underlie the roof and shield the roof from view, the headliner having an upper surface and a sound-radiating, lower surface;

a source of audio signals;

an array of electromagnetic transducer assemblies supported at the upper surface of the headliner;

signal processing circuitry coupled to the assemblies for processing the audio signals to obtain processed audio signals wherein the assemblies convert the processed audio signals into mechanical motion of corresponding zones of the headliner and wherein the headliner is made of a material which is sufficiently stiff and low in density so that the headliner radiates acoustic power into the interior of the vehicle with a frequency range defined by a lower limit of 100 hertz or less and an upper limit of 12 kilohertz or more and the processed audio signals at a low end of the frequency range are matched to the processed audio signals at mid and high ends of the frequency range and wherein the headliner material has a stiffness between 1E9PA and 5E9PA and a density of between 100 and 800 kilograms per meter cubed.

4. An audio system for use in a vehicle having a roof, the system comprising:

an acoustically-insulating headliner adapted to be mounted adjacent the roof so as to underlie the roof and shield the roof from view, the headliner having an upper surface and a sound-radiating, lower surface;

a source of audio signals;

an array of electromagnetic transducer assemblies supported at the upper surface of the headliner;

signal processing circuitry coupled to the assemblies for processing the audio signals to obtain processed audio signals wherein the assemblies convert the processed audio signals into mechanical motion of corresponding zones of the headliner and wherein the headliner is made of a material which is sufficiently stiff and low in density so that the headliner radiates acoustic power into the interior of the vehicle with a frequency range defined by a lower limit of 100 hertz or less and an upper limit of 12 kilohertz or more and the processed audio signals at a low end of the frequency range are matched to the processed audio signals at mid and high ends of the frequency range and wherein the headliner material has a stiffness (modulus of elasticity, Youngs modulus) between 1E9 Pa and 5e9 Pa and a density between 100 and 800 Kg/m^3 and wherein the headliner material is made from single materials or composites.

* * * * *